US012699645B2

(12) United States Patent
Ding et al.

(10) Patent No.: US 12,699,645 B2
(45) Date of Patent: Aug. 4, 2026

(54) TESTING CONTROL METHOD AND APPARATUS FOR APPLICATION, AND ELECTRONIC DEVICE AND STORAGE MEDIUM

(71) Applicant: Beijing Bytedance Network Technology Co., Ltd., Beijing (CN)

(72) Inventors: Guanglei Ding, Beijing (CN); Zhao Zhang, Beijing (CN); Tianqin Cai, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 397 days.

(21) Appl. No.: 18/272,424

(22) PCT Filed: Dec. 8, 2021

(86) PCT No.: PCT/CN2021/136511
§ 371 (c)(1),
(2) Date: Jul. 14, 2023

(87) PCT Pub. No.: WO2022/151876
PCT Pub. Date: Jul. 21, 2022

(65) Prior Publication Data
US 2024/0311285 A1 Sep. 19, 2024

(30) Foreign Application Priority Data

Jan. 15, 2021 (CN) .......................... 202110055289.7

(51) Int. Cl.
*G06F 11/3668* (2025.01)
*G06N 3/0464* (2023.01)
(52) U.S. Cl.
CPC ....... *G06F 11/3696* (2013.01); *G06N 3/0464* (2023.01)

(58) Field of Classification Search
CPC .......................... G06F 11/3696; G06N 3/0464
See application file for complete search history.

(56) References Cited

U.S. PATENT DOCUMENTS 8,924,938 B2 * 12/2014 Chang ................. G06F 11/3688
717/126
10,339,027 B2 * 7/2019 Garcia ................ G06F 11/3409
(Continued)

FOREIGN PATENT DOCUMENTS

CN       108255691 A       7/2018
CN       109408754 A       3/2019
(Continued)

OTHER PUBLICATIONS

International Search Report issued Feb. 24, 2022, in International (PCT) Application No. PCT/CN2021/136511, with English translation (6 pages).
(Continued)

*Primary Examiner* — Wei Y Mui
*Assistant Examiner* — Amir Soltanzadeh
(74) *Attorney, Agent, or Firm* — Astute IP Law Group

(57) ABSTRACT
A testing control method and apparatus for an application, and an electronic device and a storage medium are provided. The method includes: acquiring, in response to an automated testing request for a target application, semantic segmentation maps of a current access page and at least two consecutive historical access pages associated with the current access page, and a historical operation type and a historical operation location map that correspond to each consecutive historical access page; inputting the semantic segmentation maps, the historical operation type, and the historical operation location map into a pre-trained behavior prediction model, and acquiring a target operation type and a target operation location probability map on the current access page that are predicted by the pre-trained behavior predic-
(Continued)

Acquiring, in response to an automated testing request for a target application, semantic segmentation maps of a current access page and at least two consecutive historical access pages associated with the current access page, and a historical operation type and a historical operation location map that correspond to each of the at least two consecutive historical access pages — S101

Inputting the semantic segmentation maps, the historical operation type, and the historical operation location map into a pre-trained behavior prediction model, and acquiring a target operation type and a target operation location probability map on the current access page that are predicted by the pre-trained behavior prediction model, the target operation location probability map characterizing a probability of performing a target operation on a page location — S102

Controlling a testing of the current access page of the target application based on the target operation type and the target operation location probability map — S103 tion model; and controlling a testing of the current access page of the target application based on the target operation type and operation location probability map.

12 Claims, 7 Drawing Sheets

(56) References Cited

U.S. PATENT DOCUMENTS

| | | | |
|---|---|---|---|
| 10,515,002 B2 * | 12/2019 | Takawale | G06F 11/3688 |
| 2015/0169430 A1 | 6/2015 | Deng et al. | |
| 2019/0205606 A1 * | 7/2019 | Zhou | G06F 18/285 |
| 2020/0019488 A1 | 1/2020 | Singh et al. | |
| 2020/0074668 A1 | 3/2020 | Stenger et al. | |
| 2020/0082198 A1 | 3/2020 | Yao et al. | |
| 2020/0090511 A1 * | 3/2020 | Tao | B60W 30/0956 |

FOREIGN PATENT DOCUMENTS

| | | |
|---|---|---|
| CN | 109783094 A | 5/2019 |
| CN | 110555714 A | 12/2019 |
| CN | 111143213 A | 5/2020 |
| CN | 111242027 A | 6/2020 |
| CN | 111857719 A | 10/2020 |
| CN | 112631947 A | 4/2021 |
| WO | 2019196633 A1 | 10/2019 |

OTHER PUBLICATIONS

Office Action in CN202110055289.7, mailed Sep. 21, 2022, 7 pages.
Notice of Decision of Granting Patent Right for Invention in CN202110055289.7, mailed Mar. 27, 2023, 1 page.

* cited by examiner

Acquiring, in response to an automated testing request for a target application, semantic segmentation maps of a current access page and at least two consecutive historical access pages associated with the current access page, and a historical operation type and a historical operation location map that correspond to each of the at least two consecutive historical access pages

S101

Inputting the semantic segmentation maps, the historical operation type, and the historical operation location map into a pre-trained behavior prediction model, and acquiring a target operation type and a target operation location probability map on the current access page that are predicted by the pre-trained behavior prediction model, the target operation location probability map characterizing a probability of performing a target operation on a page location

S102

Controlling a testing of the current access page of the target application based on the target operation type and the target operation location probability map

FIG. 2(a)

Extracting first spatial information of the current access page and each of the at least two consecutive historical access pages using a 3D convolutional neural network in the pre-trained behavior prediction model, wherein the first spatial information comprises a location relationship and a size relationship among respective semantic segmentation regions in each of the current access page and the at least two consecutive historical access pages

S401

Extracting first time sequence information among the current access page and the at least two consecutive historical access pages using the 3D convolutional neural network in the pre-trained behavior prediction model, wherein the first time sequence information comprises a first association among the current access page and the at least two consecutive historical access pages that is determined based on an access page occurrence sequence

S402

Learning second time sequence information among the current access page and the at least two consecutive historical access pages that is contained in the first spatial information using the long short-term memory (LSTM) network in the pre-trained behavior prediction model, wherein the second time sequence information comprises second associations on different scales among the current access page and the at least two consecutive historical access pages

S403

Outputting the target operation type on the current access page using the first association among the current access page and the at least two consecutive historical access pages or the second associations on different scales among the current access page and the at least two consecutive historical access pages

S404

Outputting the target operation location probability map on the current access page using the location relationship and the size relationship among the respective image segmentation regions in the current access page and in each of the at least two consecutive historical access pages

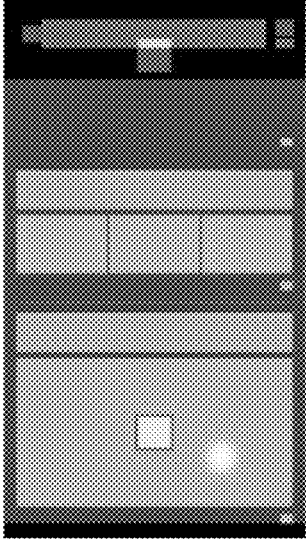

701 Processing Apparatus

702 ROM

703 RAM

704

705 I/O Interface

706 Input Device

707 Output Device

708 Storage Device

709 Communication Device

TESTING CONTROL METHOD AND APPARATUS FOR APPLICATION, AND ELECTRONIC DEVICE AND STORAGE MEDIUM

CROSS-REFERENCE TO RELATED APPLICATIONS

This is a national stage application filed under 37 U.S.C. 371 of International Patent Application No. PCT/CN2021/136511, filed Dec. 8, 2021, which claims priority to Chinese Patent Application No. 202110055289.7, filed on Jan. 15, 2021, entitled "TESTING CONTROL METHOD AND APPARATUS FOR APPLICATION, AND ELECTRONIC DEVICE AND STORAGE MEDIUM", the disclosures of which are incorporated herein by reference in their entireties.

TECHNICAL FIELD

The present disclosure relates to the technical field of automated testing, and more particularly, to a testing control method and apparatus for an application, an electronic device and an storage medium.

BACKGROUND

Application testing is a common and basic test work, and the methods thereof include a manual testing and a script testing. At present, manual testing of an application is expensive and inefficient, and some test paths are out of line with the user's real use habits and are expensive and inefficient. Script testing requires manual scripts and is difficult to implement and maintain for complex applications.

SUMMARY

The present disclosure provides a testing control method and apparatus of an application, an electronic device, and a storage medium, which can solve the problem of automated testing. The technical solution is as follows.

In a first aspect, a testing control method for an application is provided. The method including:

acquiring, in response to an automated testing request for a target application, semantic segmentation maps of a current access page and at least two consecutive historical access pages associated with the current access page, and a historical operation type and a historical operation location map that correspond to each of the at least two consecutive historical access pages;

inputting the semantic segmentation maps, the historical operation type, and the historical operation location map into a pre-trained behavior prediction model, and acquiring a target operation type and a target operation location probability map on the current access page that are predicted by the pre-trained behavior prediction model, the target operation location probability map characterizing a probability of performing a target operation on a page location; and controlling a testing of the current access page of the target application based on the target operation type and the target operation location probability map.

In a second aspect, a testing control apparatus for an application is provided. The apparatus includes:

a first acquisition module configured to acquire, in response to an automated testing request for a target application, semantic segmentation maps of a current access page and at least two consecutive historical access pages associated with the current access page, and a historical operation type and a historical operation location map that correspond to each of the at least two consecutive historical access pages;

a second acquisition module configured to input the semantic segmentation maps, the historical operation type and the historical operation location map into a pre-trained behavior prediction model, and acquire a target operation type and a target operation location probability map on the current access page that are predicted by the pre-trained behavior prediction model, the target operation location probability map characterizing a probability of performing a target operation on a page location; and a control module configured to control a testing of the current access page of the target application based on the target operation type and the target operation location probability map.

In a third aspect, an electronic device is provided. The electronic device includes one or more processors, a Memory, and one or more applications. The one or more applications are stored in the memory and configured to be executed by the one or more processors. The one or more programs are configured to perform the testing control method for the application of the first aspect of the present disclosure.

In a fourth aspect, a storage medium is provided. The storage medium has stored thereon a computer program which, when executed by a processor, implements the testing control method for the application of the first aspect of the present disclosure.

The technical solutions provided by the present disclosure bring about the beneficial effects as follows.

According to the present disclosure, with a pre-trained behavior prediction model, after an automated testing request for a target application is received, semantic segmentation maps of a current access page and at least two consecutive historical access pages associated with the current access page, an operation type and an historical operation location map of an operation performed on each of the at least two historical access pages are input into the pre-trained behavior prediction model, a target operation type and a target operation location probability map on the current access page are predicted, and then a testing of the current access page for a target application is controlled based on the operation type and the operation location probability map of the current access page. In this way, the whole test flow is driven automatically to improve the test efficiency.

BRIEF DESCRIPTION OF DRAWINGS

The above and other features, advantages, and aspects of embodiments of the present disclosure will become more apparent with reference to the following detailed description when taken in conjunction with the accompanying drawings. Throughout the drawings, same or similar reference numerals indicate same or similar elements. It should be understood that the drawings are diagrammatic and that the components and elements are not necessarily drawn to scale.

FIG. 1 is a flow chart illustrating a testing control method for an application according to an embodiment of the present disclosure;

FIG. 4 is a schematic flow diagram of another testing control method for an application according to an embodiment of the present disclosure:

DESCRIPTION OF EMBODIMENTS

Figure 2B:
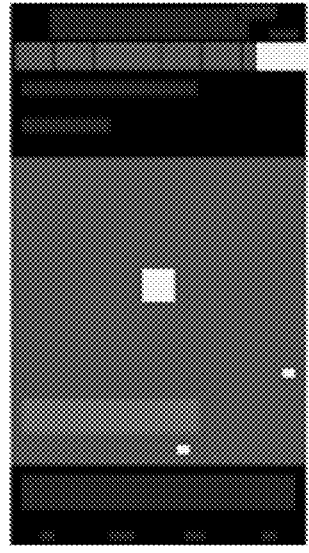
FIG. 2 is a set of access pages and semantic segmentation maps and a thermodynamic diagram corresponding thereto according to an embodiment of the present disclosure.

Embodiments of the present disclosure will be described in more detail with reference to the accompanying drawings. While certain embodiments of the present disclosure have been illustrated in the accompanying drawings, it is to be understood that the present disclosure may be embodied in various forms and should not be construed as limited to the embodiments set forth herein. Rather, these embodiments are provided so that the present disclosure will be thorough and complete. It should be understood that the drawings and examples of the present disclosure are for illustrative purposes only and are not intended to limit the scope of the present disclosure.

It should be understood that the various steps recited in the method embodiments of the present disclosure may be performed in different orders and/or in parallel. Moreover, in the method embodiments, additional steps may be included and/or performance of the steps shown may be omitted. The scope of the present disclosure is not limited in this respect.

As used herein, the term "include" and variations thereof as used herein are open-ended, i.e., "including, but not limited to". The term "based on" is "based on at least in part". The term "one embodiment" means "at least one embodiment". The term "another embodiment" means "at least one further embodiment". The term "some embodiments" means "at least some embodiments". Relevant definitions of other terms will be given in the following description.

It should be noted that references to "first", "second" and the like in this disclosure are merely used for distinguishing between apparatuses, modules or units, and are not intended to limit the apparatuses, modules or units to necessarily be different apparatuses, modules or units, and are not intended to limit the order or interdependence of the functions performed by the apparatuses, modules or units.

It is noted that the references to "a", "an" and "a plurality of" in this disclosure are intended to be illustrative and not limiting. A person skilled in the art will understand that "a", "an" and "a plurality of" are to be interpreted as "one or more" unless the context clearly dictates otherwise.

The names of interactive messages or information between devices in embodiments of the present disclosure are for illustrative purposes only and are not intended to limit the scope of such messages or information.

In order that the objects, technical solutions, and advantages of the present disclosure will become more apparent, embodiments of the present disclosure will be described in detail with reference to the accompanying drawings.

The present disclosure provides a behavior prediction method, an apparatus, an electronic device, and a storage medium, aiming to solve the above technical problems of the prior art.

The technical solutions of the present disclosure and the way in which the technical solutions of the present disclosure solve the above technical problems are described in detail in the following detailed embodiments. The following specific embodiments may be combined with each other, and the same or similar concepts or processes may not be repeated in some embodiments. Embodiments of the present disclosure will now be described with reference to the accompanying drawings.

In an embodiment of the present disclosure, a testing control method for an application is provided. As shown in FIG. 1, the method includes steps S101 to S103 as follows.

At step S101, in response to an automated testing request for a target application, semantic segmentation maps of a current access page and at least two consecutive historical access pages associated with the current access page, and a historical operation type and a historical operation location map that correspond to each of the at least two consecutive historical access pages are acquired.

An entire testing process for a target application can be driven automatically by building a model to mimic a user's behavior operations. Input to the model may be acquired when an automated testing request for the target application is received. The input to the model includes semantic segmentation maps of a current access page and at least two consecutive historical access pages associated with the current access page, and a historical operation type and a historical operation location map that correspond to each of the at least two consecutive historical access pages.

According to an embodiment of the present disclosure, each of the semantic segmentation maps is extracted by:

(1) acquiring at least one image element type from an image, the at least one image element type including at least one of text, picture and button; and (2) segmenting the image based on the at least one image element type to obtain the semantic segmentation map.

It can be understood that a semantic segmentation map is an image obtained after image segmentation is performed on an image based on at least one image element type. In a practical application process, the semantic segmentation map of the current access page or the semantic segmentation map of the historical access page can be generated by a semantic segmentation method based on depth learning or by parsing of a control in the extensible markup language (XML).

The historical operation type is an operation type of the user on the historical access page, such as an operation type of sliding, clicking, and pressing, etc. The historical operation location map indicates a location where a user operates on the historical access page.

Figure 2C:
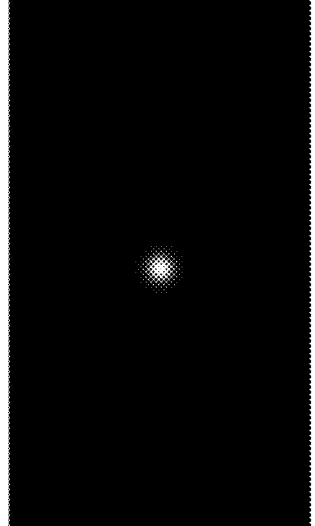

As shown in FIG. 2, for example, FIG. 2(*a*) is an original access page, FIG. 2(*b*) is a semantic segmentation map corresponding to the original access page. Here, regions of different depths can represent different semantic segmentation regions, such as a text semantic segmentation region, a picture semantic segmentation region or a button semantic segmentation region. FIG. 2(*c*) is an operation location map corresponding to the original access page, which can be specifically represented using a thermodynamic diagram. Here, the thermodynamic diagram refers to a two-dimensional image (a black-and-white diagram) of a single channel, and the operation location, i.e., a light spot position, on the original access page is shown in the diagram.

At step S102, the semantic segmentation maps, the historical operation type, and the historical operation location map are input into a pre-trained behavior prediction model, and a target operation type and a target operation location probability map on the current access page that are predicted by the pre-trained behavior prediction model are acquired. The target operation location probability map characterizes a probability of performing a target operation on a page location.

It will be appreciated that the behavior of the user can be predicted by means of a pre-trained behavior prediction model. That is, by inputting the acquired semantic segmentation maps of respective access pages, the historical operation type and the historical operation location map of each historical access page into the pre-trained behavior prediction model, an operation type of the target operation to be performed on the current access page and the probability of performing the target operation on the page location can be predicted.

Figure 3:
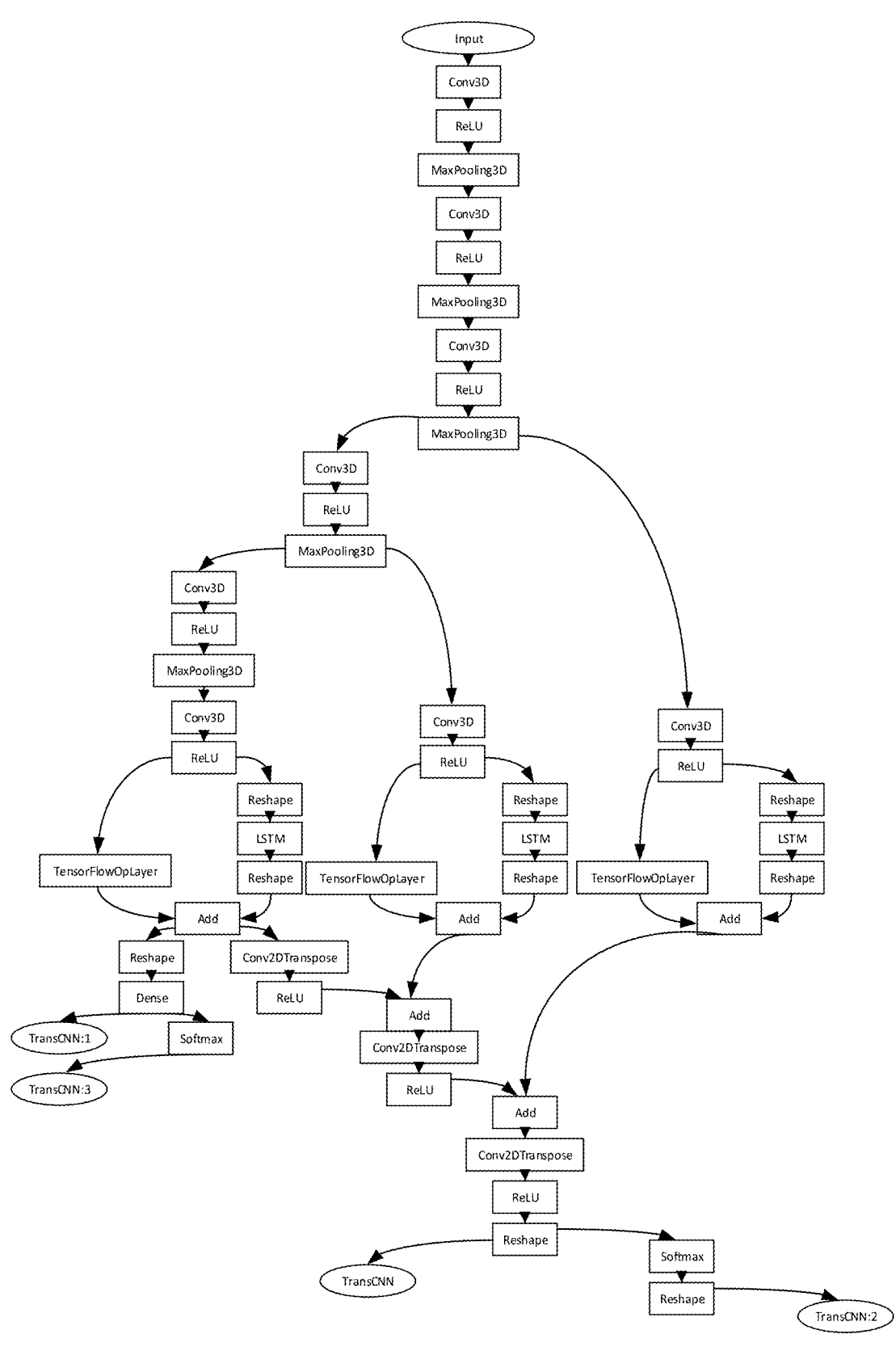
FIG. 3 is a schematic structural diagram of a behavior prediction model according to an embodiment of the present disclosure.

According to an embodiment of the present disclosure, as shown in FIG. 3, the pre-trained behavior prediction model includes a 3D convolutional neural network layer, a long short-term memory (LSTM) neural network layer, and an output layer that are cascaded.

(1) The 3D convolutional neural network layer is configured to extract spatial information of at least two consecutive access pages and time sequence information among respective access pages.

First, it should be noted that an exemplary input dimension for the model can be (4, 288, 160, 4), i.e., (4 different XML semantic segmentation regions, 288 for page height, 160 for page width, 4 pages accessed consecutively by the user).

It will be appreciated that a 3D convolutional neural network includes, but not limited to, a 3D convolution, a nonlinear activation function, and a 3D convolution stack of down-sampling layers. The 3D convolution stack can be configured to extract spatial and time sequence information included in the semantic segmentation maps.

The spatial information represents location and size relationships among respective semantic segmentation regions in a same page, and is helpful for inferring the location where an operation occurs in a page. It can be understood that an operation for a page usually occurs in a location where an image or text is present, and usually is not performed in a blank location of the page. Time sequence information refers to a correlation among different consecutive pages, which is helpful to infer an operation type adopted in a page from the view of time sequence. For example, when the operation type in each of three consecutive historical pages is sliding up at the center, an operation type adopted in an page following the three historical pages can likely be inferred, based on the time sequence information, as sliding up at the center.

(2) The long short-term memory (LSTM) neural network layer is configured to learn time sequence information of different scales in spatial information.

After extracting the spatial information and the time sequence information using the 3D convolution, one LSTM layer can be connected from different scales to enhance the learning of the time sequence information on different image scales. The cross-layer connection of different image scales helps to learn the changes of small objects and global large objects in the time sequence respectively.

It can be understood that when the number of 3D convolution stacks is smaller, the dimensions of the extracted spatial information and time sequence information are smaller, which can reflect more detailed information in the semantic segmentation map, for example, the range of each locked semantic segmentation unit is smaller. However, when the number of 3D convolution stacks is larger, the dimensions of the extracted spatial information and time sequence information are larger, which can reflect the global information in the semantic segmentation map.

(3) The output layer is configured to output the predicted operation type and the predicted operation location probability map.

The output layer for the operation type includes a fully connected layer and a normalization layer, and the operation type predicted on the page can be output at the fully connected layer. Specifically, in a practical application process, a predicted operation type can be predicted and output at the fully connected layer based on a historical operation type of an associated historical page and an association among different consecutive pages included in the time sequence information. An effective code can be output at the normalization layer, and each effective code has an operation type result corresponding thereto. TransCNN:1 and TransCNN:3 in FIG. 3 respectively represent a direct output result of the predicted operation type and a normalized one-hot code.

The output layer of the operation location probability map includes an up-sampling layer and a normalization layer. Specifically, the location and size relationships among various semantic regions in each page that are included in the spatial information are up-sampled, and then the operation location probability map is predicted and output via the normalization layer. It will be appreciated that since 3D convolution stacking is a process of downscaling an image and up-sampling is a process of up-scaling an image, the operation location probability map can be predicted and output through up-sampling corresponding to the number of the 3D convolution stackings. Embodiments of the present disclosure include, but are not limited to, 2D deconvolution for up-sampling. The location where the point with a maximal value is located in the map is the location where an operation is most likely to occur. TransCNN and TransCNN:2 in FIG. 3 respectively represent the direct output result of the predicted operation location, i.e., a location where the point of the maximal probability value is located, and the normalized operation location probability map.

At step S103, a testing of the current access page of the target application is controlled based on the target operation type and the target operation location probability map.

It will be appreciated that when the operation type and the operation location probability map for the current access page are obtained, the test for the current access page of the target application can be controlled. In particular, an operation in the target operation type can be executed at the location point with the maximal probability value in the operation location probability map, so as to complete the test for the current access page.

According to the present disclosure, with a pre-trained behavior prediction model, after an automated testing request for a target application is received, semantic segmentation maps of a current access page and at least two consecutive historical access pages associated with the current access page, an operation type and an historical operation location map of an operation performed on each of the at least two historical access pages are input into the pre-trained behavior prediction model, a target operation type and a target operation location probability map on the current access page are predicted, and then a testing of the current access page for a target application is controlled based on the operation type and the operation location probability map of the current access page. In this way, the whole test flow is driven automatically to improve the test efficiency.

According to an embodiment of the present disclosure, the controlling the testing of the current access page of the target application based on the target operation type and the target operation location probability map includes:

(1) acquiring a first page location corresponding to a first probability value in the target operation location probability map:

(2) performing an operation corresponding to the target operation type at the first page location of the current access page of the target application; and (3) performing, in response to that failure in performing the operation corresponding to the target operation type at the first page location, the operation corresponding to the target operation type at a second page location of the current access page of the target application, until the operation is performed successfully, wherein the second page location is a location corresponding to a second probability value in the target operation location probability map, and the first probability value is greater than the second probability value.

When the operation type and the operation location probability map for the current access page is acquired, a first page location corresponding to a first probability value in the target operation location probability map can be acquired subsequently. The first probability value is a probability value with the maximal value among the target operation probability values, and the first page location corresponding to the first probability value is a location where a test operation is most likely to be performed. An operation corresponding to the target operation type is performed on the first page location of the current access page to automatically complete the test.

It will be appreciated that if the operation fails to be performed at the first page location, the operation may continue to be performed at a second page location of the current access page. The second page location refers to a location corresponding to a second largest probability value in the target operation location probability map. This cycle is circulated to ensure that the operation is performed successfully.

According to an embodiment of the present disclosure, an actual operating behavior of the user may be simulated by a pre-constructed behavior prediction model, thereby allowing large-scale automated testing of an application without any human intervention. Specifically, a pre-constructed behavior prediction model may be deployed at a test server to predict a first target operation type and a first operation location probability map of a first target access page D based on semantic segmentation maps of the first target access page D and of consecutive historical access pages A, B and C, an operation type and an operation location probability map of each of the historical access pages A, B and C, and then to predict a second target operation type and a second operation location probability map of a second target access page E based on behavior data of the historical access pages B, C and of the first target page D. The above process is performed in cycles until the whole test ends. In this way, large-scale automatic test is completed through automatic interactive operations.

According to an embodiment of the present disclosure, as shown in FIG. 4, the inputting the semantic segmentation maps, the historical operation type, and the historical operation location map into the pre-trained behavior prediction model, and acquiring the target operation type and the target operation location probability map on the current access page that are predicted by the pre-trained behavior prediction model, the target operation location probability map characterizing the probability of performing the target operation on the page location, includes the following steps S401 to S405.

At step S401, first spatial information of the current access page and each of the at least two consecutive historical access pages is extracted using a 3D convolutional neural network in the pre-trained behavior prediction model. The first spatial information includes a location relationship and a size relationship among respective semantic segmentation regions in each of the access page and the at least two consecutive historical access pages.

At step S402, first time sequence information among the current access page and the at least two consecutive historical access pages is extracted using the 3D convolutional neural network in the pre-trained behavior prediction model. The first time sequence information includes a first association among the current access page and the at least two consecutive historical access pages that is determined based on an access page occurrence sequence.

The 3D convolutional neural network includes but is not limited to a 3D convolution, a nonlinear activation function and a 3D convolution stack of down-sampling layers. The 3D convolutional neural network may be used to extract the first spatial information of the current access page and each historical access page, and the first time sequence information among the current access page and the at least two consecutive historical access pages.

The first spatial information represents a location relationship and a size relationship among respective semantic segmentation regions in a same page, and is helpful for inferring a location where an operation occurs in a page. It can be understood that an operation for a page usually occurs in a location where an image or text is present, and usually is not performed in a blank location of the page. By extracting the first spatial information of the current access page and each historical access page, it is helpful to infer a location in the current access page where the operation is to be performed.

The first time sequence information refers to an correlation among different consecutive pages, which is helpful to infer an operation type adopted in an page from the view of the time sequence. For example, when the operation type in each of three consecutive historical pages is sliding up at the center, then an operation type in an page following the three historical pages is likely to be inferred as sliding up at the center based on the time sequence information. By extracting the first time sequence information among the current access page and respective historical access pages, it is helpful to infer the operation type adopted in the current access page.

At Step S403, second time sequence information among the current access page and the at least two consecutive historical access pages that is contained in the first spatial information is learned using the long short-term memory (LSTM) network in the pre-trained behavior prediction model. The second time sequence information includes second associations on different scales among the current access page and the at least two consecutive historical access pages.

After the first spatial information and the first time sequence information are extracted using the 3D convolution network, an LSTM layer can be connected from different scales so as to enhance the learning of the second time sequence information in different image scales. It can be understood that when the number of 3D convolution stacks is smaller, the dimension of the second time sequence information learned by long short-term memory (LSTM) network is smaller, which can reflect the more detailed information in the semantic segmentation map, for example, the range of each locked semantic segmentation region is smaller. However, when the number of 3D convolution stacks is larger, the dimensions of the extracted spatial information and the extracted time sequence information are larger, which can reflect the global information in the semantic segmentation map. The cross-layer connection of different image scales helps to learn the changes of small objects and global large objects in the timing sequence respectively.

At Step S404, the target operation type on the current access page is output using the first association among the current access page and the at least two consecutive historical access pages, or the second associations on different scales among the current access page and the at least two consecutive historical access pages.

The target operation type on the current access page can be output using an association among respective access pages or associations on different scales among respective access pages. In a practical application process, the predicted target operation type can be output based on the historical operation type in the historical access pages and the association among respective access pages on different scales.

According to an embodiment of the present disclosure, the outputting the target operation type on the current access page using the first association among the current access page and the at least two consecutive historical access pages or the second associations on different scales among the current access page and the at least two consecutive historical access pages includes:

(1) inputting the first association or the second association into a fully connected layer in the pre-trained behavior prediction model, and outputting an operation type code corresponding to the current access page; and (2) determining the target operation type of the current access page based on the operation type code.

It will be appreciated that after the first or second association is input into the fully connected layer, a one-bit valid code may be output and the operation type to which the one-bit valid code corresponds may be determined as the target operation type of the current access page.

Each one-bit valid code corresponds to an operation. For example, when the output one-bit valid code is [1, 0, 0, 0, 0, 0, 0, 0], the output target operation type is a click operation; when the output one-bit valid code is [0, 1, 0, 0, 0, 0, 0, 0], the output target operation type is a long press operation: when the output one-bit valid code is [0, 0, 1, 0, 0, 0, 0, 0], the output target operation type is a left sliding operation; and when the output one-bit valid code is [0, 0, 0, 1, 0, 0, 0], the output target operation type is a right sliding operation, when the output one-bit valid coding is [0, 0, 0, 0, 1, 0, 0], the output target operation type is an up sliding operation: when the output one-bit valid coding is [0, 0, 0, 0, 0, 1, 0], the output target operation type is a down sliding operation; and when the output one-bit valid coding is [0, 0, 0, 0, 0, 0, 1], the output target operation type is a return operation.

At Step S405, the target operation location probability map on the current access page is output using the location relationship and the size relationship among the respective image segmentation regions in the current access page and each of the at least two consecutive historical access page.

It can be understood that the location relationship and the size relationship among respective image segmentation regions in respective access pages are up-sampled and then are normalized to output the target operation location probability map. Here, since 3D convolution stacking is a process of downscaling an image, and up-sampling is a process of up of up-scaling an image, the operation location probability map can be predicted and output through up-sampling corresponding to the number of the 3D convolution stackings. Embodiments of the present disclosure include, but are not limited to, 2D deconvolution for up-sampling. In addition, the location where the maximum probability value is located in the operation location probability map is the location where an operation is most likely to occur.

According to an embodiment of the present disclosure, the acquiring, in response to the automated testing request for the target application, the semantic segmentation maps of the current access page and the at least two consecutive historical access pages associated with the current access page, and the historical operation type and the historical operation location map that correspond to each of the at least two consecutive historical access pages includes:

acquiring, in response to the automated testing request for the target application, the semantic segmentation maps of the current access page and three consecutive historical access pages associated with the current access page, and a historical operation type and a historical operation location map that correspond to each of the three historical access pages.

It will be appreciated that in embodiments of the present disclosure, we find in the practice application process that, predicting an operation behavior of a next page based on the behavior operations of three consecutive historical access pages can achieve a balance between prediction efficiency and prediction accuracy, and can improve the prediction efficiency as much as possible while satisfying the prediction accuracy, thereby improving the efficiency of testing the application.

Figure 5B:
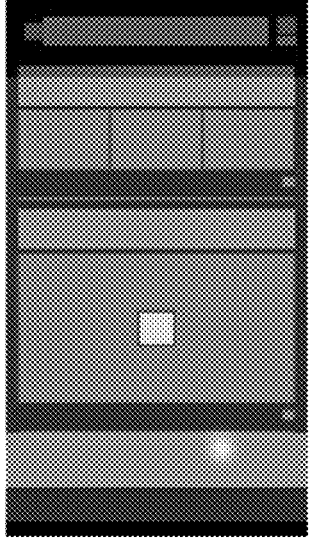
FIG. 5 is a schematic diagram of a testing control method for a set of applications according to an embodiment of the present disclosure.
Figure 5C:
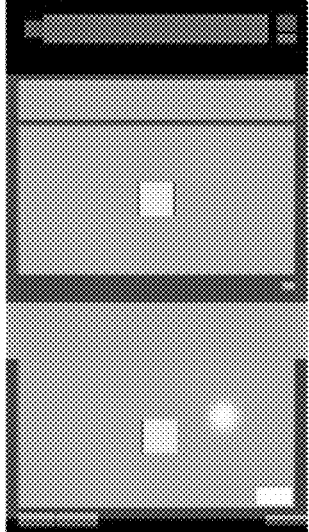
Figure 5D:
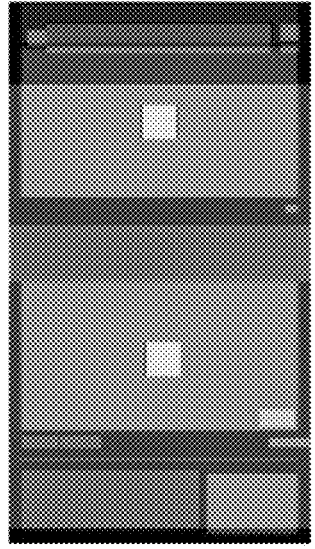
Figure 5E:
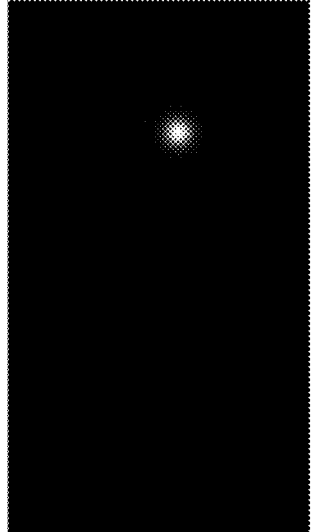

Specifically, as shown in FIG. 5, FIGS. 5(a) to 5(c) are semantic segmentation maps corresponding to three consecutive historical access pages. Here, regions of different depths respectively represent a text region, a picture region and a button region, etc. and a light spot in the map represents an operation location in the historical access page. FIG. 5(d) is a semantic segmentation map corresponding to a current access page. The FIGS. 5(a) to 5(d) and the historical operation types corresponding to FIGS. 5(a) to 5(c) are input into a pre-trained behavior prediction model. An output result is the thermodynamic diagram and a one-hot code in FIG. 5(e). The thermodynamic diagram in FIG. 5(e) refers to a two-dimensional image (black-and-white graph) of a single channel, the value in the image represents a thermal value (in the single channel image, i.e., a brightness value), the center of the bright spot in the image is the brightest and the thermal value thereof is the highest, i.e., the probability value thereof is the highest. The location of the bright spot is a predicted location where an operation is required to be performed. The one-hot code represents the target operation type adopted on the current access page.

Testing is automatically completed by automatically performing an operation of the target operation type at location of the bright spot.

Figures 6, 7:
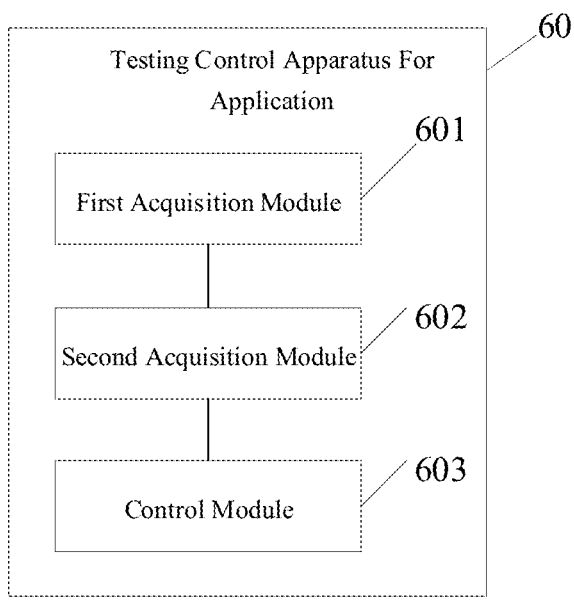
FIG. 6 is a schematic diagram showing a structure of a testing control apparatus for an application according to an embodiment of the present disclosure.
FIG. 7 is a schematic diagram showing a structure of an electronic device according to an embodiment of the present disclosure.

An embodiment of the present disclosure provides a testing control apparatus for an application. As shown in FIG. 6, the testing control apparatus 60 for the application may include a first acquisition module 601, a second acquisition module 602 and a control module 603.

The first acquisition module 601 is configured to acquire, in response to an automated testing request for a target application, semantic segmentation maps of a current access page and at least two consecutive historical access pages associated with the current access page, and a historical operation type and a historical operation location map that correspond to each of the at least two consecutive historical access pages.

The entire testing process for the target application can be driven automatically by building a model to mimic a user's behavior operations. Input to the model may be acquired upon receiving an automated testing request for the target application. The input to the model includes semantic segmentation maps of the current access page and at least two consecutive historical access pages associated with the current access page, and a historical operation type and a historical operation location map that correspond to each of the at least two consecutive historical access pages.

A second acquisition module 602 is configured to input the semantic segmentation maps, the historical operation type, and the historical operation location map into a pre-trained behavior prediction model, and acquire a target operation type and a target operation location probability map on the current access page that are predicted by the pre-trained behavior prediction model. The target operation location probability map characterizes a probability of performing a target operation on a page location.

It will be appreciated that the behavior of the user can be predicted by means of the pre-trained behavior prediction model. That is, by inputting the acquired semantic segmentation maps of respective access pages, the historical operation type and historical operation location map of each historical access page into the pre-trained behavior prediction model, the operation type of the target operation to be performed on the current access page and the probability of performing the target operation on a page location can be predicted.

A control module 603 is configured to control a testing of the current access page of the target application based on the target operation type and the target operation location probability map.

It will be appreciated that when the operation type and the operation location probability map for the current access page are obtained, the test for the current access page of the target application can be controlled. Specifically, an operation of the target operation type can be performed at the location point with the maximal probability value in the operation location probability map so as to complete the test for the current access page.

According to the present disclosure, with a pre-trained behavior prediction model, after an automated testing request for a target application is received, semantic segmentation maps of a current access page and at least two consecutive historical access pages associated with the current access page, an operation type and an historical operation location map of an operation performed on each of the at least two historical access pages are input into the pre-trained behavior prediction model, a target operation type and a target operation location probability map on the current access page are predicted, and then a testing of the current access page for a target application is controlled based on the operation type and the operation location probability map of the current access page. In this way, the whole test flow is driven automatically to improve the test efficiency.

Reference is now made to FIG. 7, which illustrates a schematic diagram showing a structure of an electronic device 700 suitable for implementing embodiments of the present disclosure. The electronic devices in embodiments of the present disclosure may include, but are not limited to, mobile terminals such as mobile phones, notebook computers, digital broadcast receivers, personal digital assistants (PDAs), portable android devices (PADs), portable multimedia players (PMPs), in-vehicle terminals (e.g., in-vehicle navigation terminals), and fixed terminals such as digital TVs, desktop computers, etc. The electronic device shown in FIG. 7 is only one example and should not impose any limitation on the functionality and scope of use of the disclosed embodiments.

The electronic device includes a memory and a processor. The processor herein may be referred to as a processing apparatus 701 described below; and the memory may include at least one of a read-only memory (ROM) 702, a random-access memory (RAM) 703 and a storage apparatus 708 described below. Specific contents of the electronic device 700 are provided as follows.

As shown in FIG. 7, the electronic device 700 may include a processing apparatus (e.g., central processor, graphics processor, etc.) 701 that may perform various suitable actions and processes based on a program stored in the read-only memory (ROM) 702 or a program loaded from the storage apparatus 708 into the random-access memory (RAM) 703. In the RAM 703, various programs and data required for the operation of the electronic device 700 are also stored. The processing apparatus 701, the ROM 702 and the RAM 703 are connected to each other via a bus 704. Furthermore, an input/output (I/O) interface 705 is connected to the bus 704.

In general, apparatuses that may be connected to the I/O interface 705 include an input device 706 including, for example, a touch screen, a touch pad, a keyboard, a mouse, a camera, a microphone, an accelerometer and a gyroscope, etc., an output device 707 including, for example, a liquid crystal display (LCD), a speaker, a vibrator, etc., a storage device 708 including, for example, a magnetic tape, a hard disk, etc., and a communication device 709. The communication device 709 can allow the electronic device 700 to communicate with other devices in a wireless or wired way to exchange data. Although FIG. 7 illustrates an electronic device 700 having various apparatuses, it should be understood that not all illustrated apparatuses are required to be implemented or provided. More or fewer apparatuses may alternatively be implemented or provided.

In particular, processes described above with reference to flow diagrams may be implemented as computer software programs according to embodiments of the present disclosure. For example, embodiments of the present disclosure include a computer program product including a computer program embodied on a non-transitory computer-readable medium, and the computer program includes program codes for performing the methods illustrated in the flowcharts. In such embodiments, the computer program may be downloaded and installed from a network via the communication device 709, or installed from storage apparatus 708 or ROM 702. The computer program, when executed by the processing apparatus 701, performs the above-described functions defined in the method according to any of the embodiments of the present disclosure.

Note that the above computer-readable medium may be a computer-readable signal medium or a computer-readable storage medium or any combination thereof. The computer-readable storage medium can be, for example, but is not limited to an electronic, magnetic, optical, electromagnetic, infrared, or semiconductor system, apparatus, or device, or any combination thereof. More specific examples of computer-readable storage media may include, but are not limited to: an electrical connection having one or more wires, a portable computer diskette, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to the present disclosure, a computer-readable storage medium may be any tangible medium that contains or stores a program that can be used by or in connection with an instruction execution system, apparatus, or device. According to the present disclosure, a computer-readable signal medium may include a data signal propagated in baseband or propagated as part of a carrier wave and may carry computer-readable program codes. Such propagated data signal may take many forms, including but not limited to an electromagnetic signal, an optical signal, or any suitable combination thereof. The computer-readable signal medium may be any computer-readable medium other than a computer-readable storage medium, and can send, propagate, or transport the program for use by or use in connection with the instruction execution system, apparatus, or device. The program codes embodied on the computer readable medium may be transmitted over any suitable medium including, but not limited to an electric wire, an optic cable, a radio frequency (RF), and the like, or any suitable combination thereof.

In some embodiments, clients and servers may perform communication using any currently known or future developed network protocol, such as HyperText Transfer Protocol (HTTP), and may be interconnected with any form or medium of digital data communication (e.g., a communication network). Examples of communication networks include local area networks ("LAN"), wide area networks ("WAN"), internetworks (e.g., the Internet), and peer-to-peer networks (e.g., the ad hoc peer-to-peer network), as well as any network currently known or developed in the future.

The computer-readable medium may be embodied in the electronic device, or may be separate from the electronic device and not incorporated into the electronic device.

The computer-readable medium carries one or more programs that, when executed by the electronic device, cause the electronic device to acquire, in a process of testing user behavior on a target application, historical behavior data corresponding to a target page currently to be measured. The historical behavior data includes one historical page preceding the target page or at least two consecutive historical pages preceding the target page, and historical operation behavior on each historical page. Alternatively, the computer-readable medium carries one or more programs which, when executed by the electronic device, cause the electronic device to:

acquire, in response to an automated testing request for a target application, semantic segmentation maps of a current access page and at least two consecutive historical access pages associated with the current access page, and a historical operation type and a historical operation location map that correspond to each of the at least two consecutive historical access pages;

input the semantic segmentation maps, the historical operation type, and the historical operation location map into a pre-trained behavior prediction model, and acquire a target operation type and a target operation location probability map on the current access page that are predicted by the pre-trained behavior prediction model, the target operation location probability map characterizing a probability of performing a target operation on a page location; and control a testing of the current access page of the target application based on the target operation type and the target operation location probability map.

Computer program codes for carrying out operations of the present disclosure may be written in one or more programming languages, including but is not limited to object-oriented programming languages, such as Java, smalltalk, C++, and conventional procedural programming languages, such as the "C" language or similar programming languages, or combinations thereof. The program codes may be executed entirely on a user computer, executed partially on a user computer, executed as a stand-alone software package, or executed partially on a user computer and partially on a remote computer, or executed entirely on a remote computer or server. In the case of a remote computer involved, the remote computer may be connected to the user computer through any kind of network, including a local area network (LAN) or a wide area network (WAN), or may be connected to an external computer (e.g., through the Internet using an Internet service provider).

The flowcharts and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical functions. It should also be noted that in some alternative implementations, the functions noted in the blocks may occur out of the order noted in the figures. For example, two consecutive blocks may in fact be executed substantially in parallel, or they may sometimes be executed in the reverse order, depending on the functionality involved. It is also noted that each block of the block diagrams and/or flowchart illustrations, and combinations of blocks in the block diagrams and/or flowchart illustrations, can be implemented by special purpose hardware-based systems which carry out the specified functions or operations, or combinations of special purpose hardware and computer instructions.

The modules or elements described in connection with the embodiments disclosed herein may be implemented in software or hardware. The name of a module or unit does not in any way constitute a limitation on the unit itself.

The functions described herein above may be performed, at least in part, by one or more hardware logic components. For example, without limitation, exemplary types of hardware logic components that may be used include: Field Programmable Gate Arrays (FPGA), Application Specific Integrated Circuits (ASIC), Application Specific Standard Products (ASSP), System on Chip (SOC), Complex Programmable Logic Devices (CPLD), etc.

In the context of the invention, a machine-readable medium can be a tangible medium that can contain or store a program for use by or in connection with an instruction execution system, device, or apparatus. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any suitable combination thereof. More specific examples of a machine-readable storage medium may include one or more wire-based electrical connections, a portable computer diskette, a hard disk, a random-access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof.

According to one or more embodiments of the present disclosure, a testing control method for an application is provided. The testing control method for the application includes:

acquiring, in response to an automated testing request for a target application, semantic segmentation maps of a current access page and at least two consecutive historical access pages associated with the current access page, and a historical operation type and a historical operation location map that correspond to each of the at least two consecutive historical access pages;

inputting the semantic segmentation maps, the historical operation type, and the historical operation location map into a pre-trained behavior prediction model, and acquiring a target operation type and a target operation location probability map on the current access page that are predicted by the pre-trained behavior prediction model, the target operation location probability map characterizing a probability of performing a target operation on a page location; and controlling a testing of the current access page of the target application based on the target operation type and the target operation location probability map.

According to an embodiment of the present disclosure, the pre-trained behavior prediction model comprises a 3D convolutional neural network layer, a long short-term memory (LSTM) neural network layer and an output layer that are cascaded. The 3D convolutional neural network layer is configured to extract spatial information of at least two consecutive access pages and time sequence information among respective access pages. The long short-term memory (LSTM) neural network layer is configured to learn time sequence information of different scales in the spatial information. The output layer is configured to output the predicted operation type and the predicted operation location probability map.

According to an embodiment of the present disclosure, the inputting the semantic segmentation maps, the historical operation type, and the historical operation location map into the pre-trained behavior prediction model, and acquiring the target operation type and the target operation location probability map on the current access page that are predicted by the pre-trained behavior prediction model, the target operation location probability map characterizing a probability of performing a target operation on a page location, comprises:

extracting first spatial information of the current access page and each of the at least two consecutive historical access pages using a 3D convolutional neural network in the pre-trained behavior prediction model, wherein the first spatial information comprises a location relationship and a size relationship among respective semantic segmentation regions in each of the current access page and the at least two consecutive historical access pages;

extracting first time sequence information among the current access page and the at least two consecutive historical access pages using the 3D convolutional neural network in the pre-trained behavior prediction model, wherein the first time sequence information comprises a first association among the current access page and the at least two consecutive historical access pages that is determined based on an access page occurrence sequence;

learning second time sequence information among the current access page and the at least two consecutive historical access pages that is contained in the first spatial information using the long short-term memory (LSTM) network in the pre-trained behavior prediction model, wherein the second time sequence information comprises second associations on different scales among the current access page and the at least two consecutive historical access pages;

outputting the target operation type on the current access page using the first association among the current access page and the at least two consecutive historical access pages or the second associations on different scales among the current access page and the at least two consecutive historical access pages; and outputting the target operation location probability map on the current access page using the location relationship and the size relationship among the respective image segmentation regions in the current access page and in each of the at least two consecutive historical access pages.

According to an embodiment of the present disclosure, the acquiring, in response to the automated testing request for the target application, the semantic segmentation maps of the current access page and the at least two consecutive historical access pages associated with the current access page, and the historical operation type and the historical operation location map that correspond to each of the at least two consecutive historical access pages includes: acquiring, in response to the automated testing request for the target application, the semantic segmentation maps of the current access page and three consecutive historical access pages associated with the current access page, and a historical operation type and a historical operation location map that correspond to each of the three historical access pages.

According to an embodiment of the present disclosure, the controlling the testing of the current access page of the target application based on the target operation type and the target operation location probability map includes:

acquiring a first page location corresponding to a first probability value in the target operation location probability map;

performing an operation corresponding to the target operation type at the first page location of the current access page of the target application; and performing, in response to failure in performing the operation corresponding to the target operation type at the first page location, the operation corresponding to the target operation type at a second page location of the current access page of the target application, until the operation is performed successfully, wherein the second page location is a location corresponding to a second probability value in the target operation location probability map, and the first probability value is greater than the second probability value.

According to an embodiment of the present disclosure, each of the semantic segmentation maps is extracted by:

acquiring at least one image element type from an image, the at least one image element type comprising at least one of text, picture, and button; and segmenting the image based on the at least one image element type to obtain the semantic segmentation map.

According to one or more embodiments of the present disclosure, a testing control apparatus for an application is provided. The testing control apparatus for the application includes:

a first acquisition module configured to acquire, in response to an automated testing request for a target application, semantic segmentation maps of a current access page and at least two consecutive historical access pages associated with the current access page, and a historical operation type and a historical operation location map that correspond to each of the at least two consecutive historical access pages;

a second acquisition module configured to input the semantic segmentation maps, the historical operation type and the historical operation location map into a pre-trained behavior prediction model, and acquire a target operation type and a target operation location probability map on the current access page that are predicted by the pre-trained behavior prediction model, the target operation location probability map characterizing a probability of performing a target operation on a page location; and a control module configured to control a testing of the current access page of the target application based on the target operation type and the target operation location probability map.

According to an embodiment of the present disclosure, the pre-trained behavior prediction model includes a 3D convolutional neural network layer, a long short-term memory (LSTM) neural network layer, and an output layer that are cascaded. The 3D convolutional neural network layer is configured to extract spatial information of at least two consecutive accessed pages and time sequence information among respective accessed pages. The long short-term memory (LSTM) neural network layer is configured to learn time sequence information of different scales in the spatial information. The output layer is configured to output the predicted operation type and the predicted operation location probability map.

According to an embodiment of the present disclosure, the second acquisition module includes:

a first extraction sub-module configured to extract first spatial information of the current access page and each of the at least two consecutive historical access pages using a 3D convolutional neural network in the pre-trained behavior prediction model, wherein the first spatial information comprises a location relationship and a size relationship among respective semantic segmentation regions in each of the current access page and the at least two consecutive historical access pages;

a second extraction sub-module configured to extract first time sequence information among the current access page and the at least two consecutive historical access pages using the 3D convolutional neural network in the pre-trained behavior prediction model, wherein the first time sequence information comprises a first association among the current access page and the at least two consecutive historical access pages that is determined based on an access page occurrence sequence;

a learning sub-module configured to learn second time sequence information among the current access page and the at least two consecutive historical access pages that is contained in the first spatial information using the long short-term memory (LSTM) network in the pre-trained behavior prediction model, wherein the second time sequence information comprises second associations on different scales among the current access page and the at least two consecutive historical access pages;

a first output sub-module configured to output the target operation type on the current access page using the first association among the current access page and the at least two consecutive historical access pages, or the second associations on different scales among the current access page and the at least two consecutive historical access pages; and a second output sub-module configured to output the target operation location probability map on the current access page using the location relationship and the size relationship among the respective image segmentation regions in the current access page and in each of the at least two consecutive historical access pages.

According to an embodiment of the present disclosure, the first acquisition module includes: a first acquisition sub-module configured to acquire, in response to the automated testing request for the target application, the semantic segmentation maps of the current access page and three consecutive historical access pages associated with the current access page, and a historical operation type and a historical operation location map that correspond to each of the three historical access pages.

According to an embodiment of the present disclosure, the control module includes: an acquisition sub-module configured to acquire a first page location corresponding to a first probability value in the target operation location probability map; a first execution sub-module configured to perform an operation corresponding to the target operation type at the first page location of the current access page of the target application; and a second execution sub-module configured to perform, in response to that the operation corresponding to the target operation type at the first page location fails to be performed, the operation corresponding to the target operation type at a second page location of the current access page of the target application, until the operation is performed successfully. The second page location is a location corresponding to a second probability value in the target operation location probability map, and the first probability value is greater than the second probability value.

According to an embodiment of the present disclosure, each of the semantic segmentation maps is extracted by: acquiring at least one image element type from an image, the at least one image element type comprising at least one of text, picture, and button; and segmenting the image based on the at least one image element type to obtain the semantic segmentation map.

According to one or more embodiments of the present disclosure, an electronic device is provided. The electronic device includes one or more processors, a memory, and one or more applications. The one or more applications are stored in the memory and are configured to be executed by the one or more processors. The one or more programs are configured to perform the testing control method for the application of the present disclosure.

According to one or more embodiments of the present disclosure, a computer-readable storage medium is provided. The computer-readable storage medium has stored thereon a computer program that, when executed by a processor, implements the testing control method for the application of the present disclosure.

The foregoing description is only illustrative of the preferred embodiments of the present disclosure and of the principles of the technology employed. It will be understood by a person skilled in the art that the scope of disclosure referred to in this disclosure is not limited to technical solutions formed by the particular combinations of features described above, but is intended to cover technical solutions formed by any other combinations of features described above or their equivalents without departing from the spirit of the present disclosure, for example, a technical solution formed by replacement of the above-mentioned features with the technical features disclosed in the present disclosure (but not limited to thereto) having similar functions or vice versa.

Further, while operations are depicted in a particular order, this should not be understood to require that the operations be performed in the particular order shown or in a sequential order. Under certain circumstances, multitasking and parallel processing may be advantageous. As such, specific implementation details have been included in the above discussion, these should not be construed as limiting the scope of the present disclosure. Certain features that are described in the context of separate embodiments may also be implemented in combination in a single embodiment. Conversely, various features that are described in the context of a single embodiment can also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above.

Rather, the specific features and acts described above are merely example forms of implementing the claims.

What is claimed is:

1. A testing control method for an application, comprising:

acquiring, in response to an automated testing request for a target application, semantic segmentation maps of a current access page and at least two consecutive historical access pages associated with the current access page, and a historical operation type and a historical operation location map that correspond to each of the at least two consecutive historical access pages;

inputting the semantic segmentation maps, the historical operation type, and the historical operation location map into a pre-trained behavior prediction model, and acquiring a target operation type and a target operation location probability map on the current access page that are predicted by the pre-trained behavior prediction model, the target operation location probability map characterizing a probability of performing a target operation on a page location; and controlling a testing of the current access page of the target application based on the target operation type and the target operation location probability map, wherein the pre-trained behavior prediction model comprises a 3D convolutional neural network layer, a long short-term memory (LSTM) neural network layer and an output layer that are cascaded, wherein the 3D convolutional neural network layer is configured to extract spatial information of at least two consecutive access pages and time sequence information among respective access pages;

the LSTM neural network layer is configured to learn time sequence information of different scales in the spatial information; and the output layer is configured to output the predicted operation type and the predicted operation location probability map, and wherein said inputting the semantic segmentation maps, the historical operation type, and the historical operation location map into the pre-trained behavior prediction model, and acquiring the target operation type and the target operation location probability map on the current access page that are predicted by the pre-trained behavior prediction model comprises:

extracting first spatial information of the current access page and each of the at least two consecutive historical access pages using the 3D convolutional neural network layer in the pre-trained behavior prediction model, wherein the first spatial information comprises a location relationship and a size relationship among respective semantic segmentation regions in each of the current access page and the at least two consecutive historical access pages;

extracting first time sequence information among the current access page and the at least two consecutive historical access pages using the 3D convolutional neural network layer in the pre-trained behavior prediction model, wherein the first time sequence information comprises a first association among the current access page and the at least two consecutive historical access pages that is determined based on an access page occurrence sequence;

learning second time sequence information among the current access page and the at least two consecutive historical access pages that is contained in the first spatial information using the LSTM network layer in the pre-trained behavior prediction model, wherein the second time sequence information comprises second associations on different scales among the current access page and the at least two consecutive historical access pages;

outputting the target operation type on the current access page using the first association among the current access page and the at least two consecutive historical access pages or the second associations on different scales among the current access page and the at least two consecutive historical access pages; and outputting the target operation location probability map on the current access page using the location relationship and the size relationship among the respective semantic segmentation regions in the current access page and in each of the at least two consecutive historical access pages.

2. The method according to claim 1, wherein said acquiring, in response to the automated testing request for the target application, the semantic segmentation maps of the current access page and the at least two consecutive historical access pages associated with the current access page, and the historical operation type and the historical operation location map that correspond to each of the at least two consecutive historical access pages comprises:

acquiring, in response to the automated testing request for the target application, the semantic segmentation maps of the current access page and three consecutive historical access pages associated with the current access page, and a historical operation type and a historical operation location map that correspond to each of the three historical access pages.

3. The method according to claim 1, wherein said controlling the testing of the current access page of the target application based on the target operation type and the target operation location probability map comprises:

acquiring a first page location corresponding to a first probability value in the target operation location probability map;

performing an operation corresponding to the target operation type at the first page location of the current access page of the target application; and performing, in response to failure in performing the operation corresponding to the target operation type at the first page location, the operation corresponding to the target operation type at a second page location of the current access page of the target application, until the operation is performed successfully, wherein the second page location is a location corresponding to a second probability value in the target operation location probability map, and the first probability value is greater than the second probability value.

4. The method according to claim 1, wherein each of the semantic segmentation maps is extracted by:

acquiring at least one image element type from an image, the at least one image element type comprising at least one of text, picture, and button; and segmenting the image based on the at least one image element type to obtain the semantic segmentation map.

5. An electronic device, comprising:

one or more processors;

a memory; and one or more application programs, wherein the one or more applications are stored in the memory and configured to be executed by the one or more processors, the one or more application are programs configured to:

acquire, in response to an automated testing request for a target application, semantic segmentation maps of a current access page and at least two consecutive historical access pages associated with the current access page, and a historical operation type and a historical operation location map that correspond to each of the at least two consecutive historical access pages;

input the semantic segmentation maps, the historical operation type, and the historical operation location map into a pre-trained behavior prediction model, and acquire a target operation type and a target operation location probability map on the current access page that are predicted by the pre-trained behavior prediction model, the target operation location probability map characterizing a probability of performing a target operation on a page location; and control a testing of the current access page of the target application based on the target operation type and the target operation location probability map, wherein the pre-trained behavior prediction model comprises a 3D convolutional neural network layer, a long short-term memory (LSTM) neural network layer and an output layer that are cascaded, wherein the 3D convolutional neural network layer is configured to extract spatial information of at least two consecutive access pages and time sequence information among respective access pages;

the long short-term memory (LSTM) neural network layer is configured to learn time sequence information of different scales in the spatial information; and the output layer is configured to output the predicted operation type and the predicted operation location probability map, and wherein the one or more application programs are further configured to:

extract first spatial information of the current access page and each of the at least two consecutive historical access pages using the 3D convolutional neural network layer in the pre-trained behavior prediction model, wherein the first spatial information comprises a location relationship and a size relationship among respective semantic segmentation regions in each of the current access page and the at least two consecutive historical access pages;

extract first time sequence information among the current access page and the at least two consecutive historical access pages using the 3D convolutional neural network layer in the pre-trained behavior prediction model, wherein the first time sequence information comprises a first association among the current access page and the at least two consecutive historical access pages that is determined based on an access page occurrence sequence;

learn second time sequence information among the current access page and the at least two consecutive historical access pages that is contained in the first spatial information using the LSTM network layer in the pre-trained behavior prediction model, wherein the second time sequence information comprises second associations on different scales among the current access page and the at least two consecutive historical access pages;

output the target operation type on the current access page using the first association among the current access page and the at least two consecutive historical access pages or the second associations on different scales among the current access page and the at least two consecutive historical access pages; and output the target operation location probability map on the current access page using the location relationship and the size relationship among the respective semantic segmentation regions in the current access page and in each of the at least two consecutive historical access pages.

6. A non-transitory computer-readable storage medium having stored thereon a computer program which, when executed by a processor, implements the steps of:

acquiring, in response to an automated testing request for a target application, semantic segmentation maps of a current access page and at least two consecutive historical access pages associated with the current access page, and a historical operation type and a historical operation location map that correspond to each of the at least two consecutive historical access pages;

inputting the semantic segmentation maps, the historical operation type, and the historical operation location map into a pre-trained behavior prediction model, and acquiring a target operation type and a target operation location probability map on the current access page that are predicted by the pre-trained behavior prediction model, the target operation location probability map characterizing a probability of performing a target operation on a page location; and controlling a testing of the current access page of the target application based on the target operation type and the target operation location probability map, wherein the pre-trained behavior prediction model comprises a 3D convolutional neural network layer, a long short-term memory (LSTM) neural network layer and an output layer that are cascaded, wherein the 3D convolutional neural network layer is configured to extract spatial information of at least two consecutive access pages and time sequence information among respective access pages;

the LSTM neural network layer is configured to learn time sequence information of different scales in the spatial information; and the output layer is configured to output the predicted operation type and the predicted operation location probability map, and wherein said inputting the semantic segmentation maps, the historical operation type, and the historical operation location map into the pre-trained behavior prediction model, and acquiring the target operation type and the target operation location probability map on the current access page that are predicted by the pre-trained behavior prediction model comprises:

extracting first spatial information of the current access page and each of the at least two consecutive historical access pages using the 3D convolutional neural network layer in the pre-trained behavior prediction model, wherein the first spatial information comprises a location relationship and a size relationship among respective semantic segmentation regions in each of the current access page and the at least two consecutive historical access pages;

extracting first time sequence information among the current access page and the at least two consecutive historical access pages using the 3D convolutional neural network layer in the pre-trained behavior prediction model, wherein the first time sequence information comprises a first association among the current access page and the at least two consecutive historical access pages that is determined based on an access page occurrence sequence;

learning second time sequence information among the current access page and the at least two consecutive historical access pages that is contained in the first spatial information using the LSTM network layer in the pre-trained behavior prediction model, wherein the second time sequence information comprises second associations on different scales among the current access page and the at least two consecutive historical access pages;

outputting the target operation type on the current access page using the first association among the current access page and the at least two consecutive historical access pages or the second associations on different scales among the current access page and the at least two consecutive historical access pages; and outputting the target operation location probability map on the current access page using the location relationship and the size relationship among the respective semantic segmentation regions in the current access page and in each of the at least two consecutive historical access pages.

7. The electronic device according to claim 5, wherein the one or more application programs are further configured to:

acquire, in response to the automated testing request for the target application, the semantic segmentation maps of the current access page and three consecutive historical access pages associated with the current access page, and a historical operation type and a historical operation location map that correspond to each of the three historical access pages.

8. The electronic device according to claim 5, wherein the one or more application programs are further configured to:

acquire a first page location corresponding to a first probability value in the target operation location probability map;

perform an operation corresponding to the target operation type at the first page location of the current access page of the target application; and perform, in response to failure in performing the operation corresponding to the target operation type at the first page location, the operation corresponding to the target operation type at a second page location of the current access page of the target application, until the operation is performed successfully, wherein the second page location is a location corresponding to a second probability value in the target operation location probability map, and the first probability value is greater than the second probability value.

9. The electronic device according to claim 5, wherein the one or more application programs are further configured to:

acquire at least one image element type from an image, the at least one image element type comprising at least one of text, picture, and button; and segment the image based on the at least one image element type to obtain the semantic segmentation map.

10. The non-transitory computer-readable storage medium according to claim 6, wherein said acquiring, in response to the automated testing request for the target application, the semantic segmentation maps of the current access page and the at least two consecutive historical access pages associated with the current access page, and the historical operation type and the historical operation location map that correspond to each of the at least two consecutive historical access pages comprises:

acquiring, in response to the automated testing request for the target application, the semantic segmentation maps of the current access page and three consecutive historical access pages associated with the current access page, and a historical operation type and a historical operation location map that correspond to each of the three historical access pages.

11. The non-transitory computer-readable storage medium according to claim 6, wherein said controlling the testing of the current access page of the target application based on the target operation type and the target operation location probability map comprises:

acquiring a first page location corresponding to a first probability value in the target operation location probability map;

performing an operation corresponding to the target operation type at the first page location of the current access page of the target application; and performing, in response to failure in performing the operation corresponding to the target operation type at the first page location, the operation corresponding to the target operation type at a second page location of the current access page of the target application, until the operation is performed successfully, wherein the second page location is a location corresponding to a second probability value in the target operation location probability map, and the first probability value is greater than the second probability value.

12. The non-transitory computer-readable storage medium according to claim 6, wherein each of the semantic segmentation maps is extracted by:

acquiring at least one image element type from an image, the at least one image element type comprising at least one of text, picture, and button; and segmenting the image based on the at least one image element type to obtain the semantic segmentation map.

\*   \*   \*   \*   \*